Feb. 9, 1960 K. MAAZ 2,924,759
HALL-VOLTAGE GENERATING DEVICE
Filed Oct. 16, 1958 2 Sheets-Sheet 1

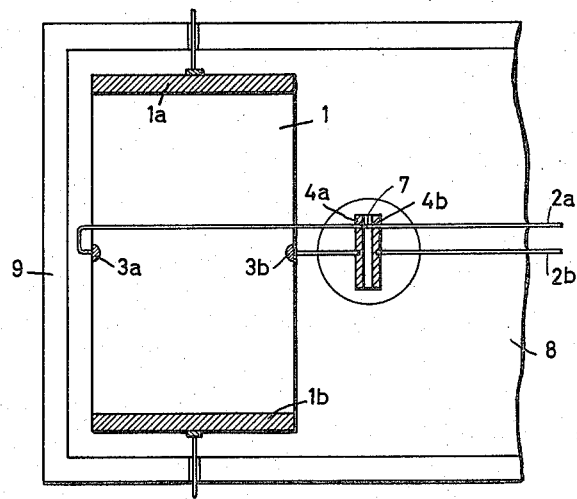
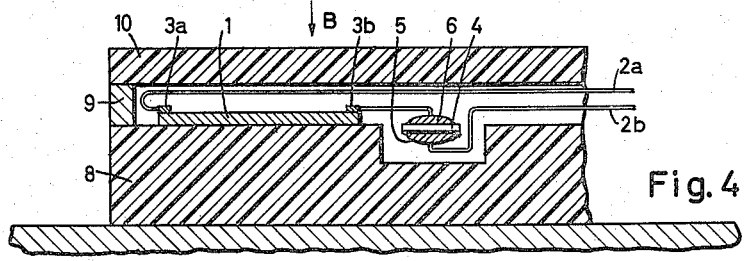
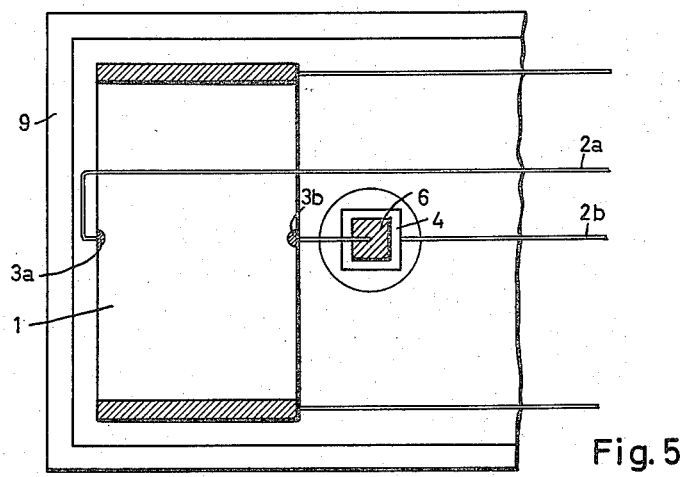

United States Patent Office 2,924,759
Patented Feb. 9, 1960

2,924,759

HALL-VOLTAGE GENERATING DEVICE

Karl Maaz, Nurnberg, Germany, assignor to Siemens-Schuckertwerke Aktiengesellschaft, Berlin-Siemensstadt and Erlangen, Germany, a corporation of Germany Application October 16, 1958, Serial No. 767,693

6 Claims. (Cl. 317—234)

My invention relates to Hall-voltage generating devices and has for its object to improve the accuracy of the voltage output as desired for use of the device as a measuring or sensing member.

Hall-voltage generating devices, also called "Hall generators," comprise a wafer of semiconductor material, the so-called Hall plate, to which two current supply terminals and two output electrodes are attached. The two output electrodes, called "Hall electrodes," define together an axis at a right angle to the current axis of the terminals in the plane of the Hall plate. When current is being passed through the Hall plate by connecting the terminals to a current source, the two Hall electrodes have the same electric potential if the Hall plate is not subjected to a magnetic field. When a magnetic field, having a direction or component perpendicular to the plane of the plate, is effective, the two Hall electrodes assume respectively different potentials and thus provide a "Hall voltage" between each other. This Hall voltage is proportional to the product of the current passing through the Hall plate times the intensity of the magnetic field in the direction perpendicular to the plate.

The Hall voltage, however, may depart from the correct value due to thermal effects. It has been attempted, therefore, to improve the accuracy, particularly for measuring purposes, by connecting a magnetic-field responsive resistor with the Hall plate so as to compensate the temperature dependence of the Hall generator. Suitable for this purpose are magnetic-field responsive resistors, such as semiconductors, having a negative temperature coefficient of resistance.

When providing for temperature compensation of a Hall generator with the aid of such a thermo-negative resistor, the resistor must be placed in such a position relative to the magnetic field that the current-flow direction in the compensating resistor coincides with the direction of the magnetic field. It has been found, however, that a satisfactory compensation cannot be achieved in this manner to the desired extent. It is therefore a more specific object of my invention to eliminate or greatly minimize such shortcoming.

To this end, and in accordance with a feature of my invention, I design and mount the compensating resistor in such a manner that its terminals, to which the leads of the Hall-voltage output circuit are attached, are situated at the same or substantially the same temperature, preferably at one and the same location of the mounting structure to which the Hall generator proper as well as the semiconducting compensating resistor are secured. For this purpose the semiconductor is either subdivided into two or more individual resistor bodies, or the resistor body is given U-shape so that both of its end points are located in proximity to each other at the same temperature spot of the device.

My invention is predicated upon the recognition that the above-mentioned failure of the known magnetic-field responsive resistors in the compensating circuits of Hall generators is due to the fact that the end points of the compensating resistor may assume different temperature values and that this may cause the generation of disturbing thermovoltages in the Hall circuit, since under such conditions the semiconducting resistor has a hot and a cold junction and thus operates as a thermoelement. This is particularly the case because in the known devices one of the two junction points at which the circuit lead is soldered to the semiconducting resistor is located close to a magnetic pole surface which dissipates the heat losses of the Hall generator particularly well and thus assumes a lower temperature than the other junction point of the resistor which faces the Hall generator. By modifying the compensating resistor in accordance with my invention, both of its end points become located so close together as to be subjected to the same temperature conditions. Hence they assume substantially the same temperature under any operating conditions of the device. As a result the error effects heretofore encountered are eliminated, thus greatly increasing the accuracy of the Hall-generator output.

The invention will be further explained with reference to the drawing in which:

Fig. 1 shows a cross section of a Hall generator device equipped with a compensating resistor of the type heretofore known, whereas

Fig. 3 is a top view of the device shown in Fig. 2, the cover of the housing being removed;

Fig. 4 is a cross section of another Hall generator according to the invention; and Fig. 5 is top view of the same device, the insulating cover of the housing being removed.

Figure 1:
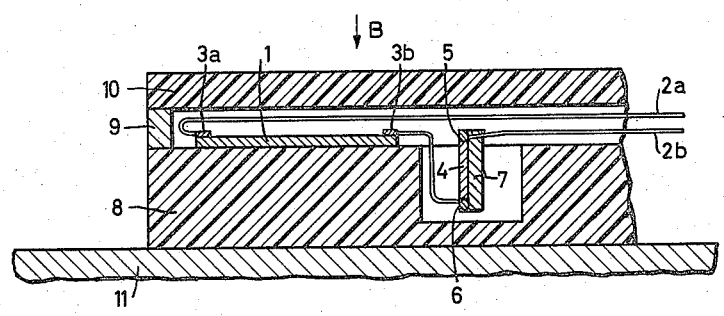

The device illustrated in Fig. 1 comprises a Hall plate 1 which consists essentially of a rectangular wafer of semiconductor material and is provided with current supply terminals (corresponding to terminals 1a, 1b in Fig. 3) and with two Hall electrodes 3a and 3b to which the leads 2a and 2b of the Hall-voltage output circuits are attached. The device is provided with a compensating resistor 4 of semiconductor material connected in series between Hall electrode 3b and lead 2b. For this purpose the ends of the compensating resistor 4 are provided with solder junctions 5 and 6. The compensating resistor 4, consisting of a smaller wafer than the Hall plate 1, is mounted on an insulator plate 7 in face-to-face contact therewith. Further insulating bodies 8, 9 and 10 serve for holding the Hall plate as well as the compensating resistor and for encapsulating these devices as well as their connections with the circuit leads. The pole face of a magnet structure is denoted by 11. The magnetic field of structure 11 has the direction indicated by an arrow B and passes perpendicularly through the plane of the Hall plate, whereas the wafer plane of the compensating resistor 4 and its current flow extend parallel to the direction of the field.

As explained above, the junction points 5 and 6 of resistor 4 may assume different temperatures due to the fact that the junction 6 is located closer to the heat dissipating pole structure 11 than the junction 5. As a result the above-mentioned thermoelectric effects may falsify the voltage output and thus the measuring result.

Figure 2:
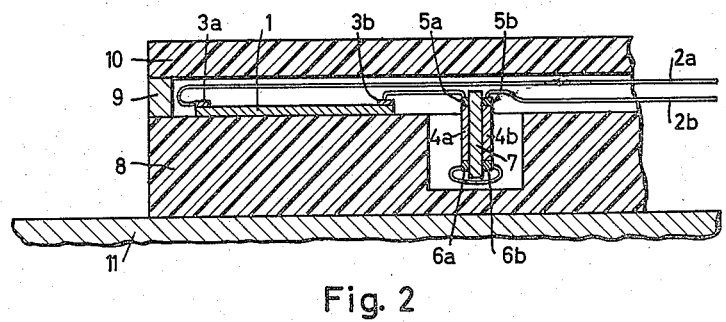
Fig. 2 shows a cross section of a Hall generator according to the invention.

In the device according to the invention, shown in Figs. 2 and 3, the compensating resistor in a Hall-generator assembly otherwise similar to that described above with reference to Fig. 1, is divided into two individual semiconductor wafers 4a and 4b. The two lower ends 6a and 6b of the two resistor bodies are electrically interconnected, and both bodies are mounted on opposite sides of the insulator 7 so as to form together a substantially U-shaped assembly, with the upper terminal junctions 5a and 5b located in proximity to each other and relatively remote from the location of the lower end points 6a, 6b. As a result, the temperature at the two lower end points 6a and 6b is substantially the same under all operating conditions; and the temperature at the upper end points 5a, 5b, is also the same although it may be different from the temperature at the lower ends. The thermoelectric voltages that may be generated in the two resistor bodies 4a and 4b have substantially the same magnitude but opposed polarities so as to cancel each other. The compensating resistor as a whole, therefore, performs its compensating action only with respect to magnetic effects but is insensitive to changes in temperature or to any difference in temperature between the upper and lower ends.

In devices according to the invention, the semiconductor material of the Hall plate 1 may consist of crystalline germanium but it is generally preferably to use substance of higher carrier mobility, namely indium arsenide (InAs). The resistor bodies 4a and 4b also consist of crystalline semiconductor material and are preferably made of indium antimonide.

Instead of using two resistor bodies 4a and 4b interconnected by a wire, a single resistor body of U-shaped configuration may be used instead. The material of the insulating parts 7, 8, 9 and 10 may be ceramic or plastic. The ceramic material available in commerce under the trade name "Degussit" has been used to advantage. This material consists of sintered aluminum oxide ($Al_2O_3$).

The modified Hall generator shown in Figs. 4 and 5 is largely similar to that described above with reference to Figs. 2 and 3, as is apparent from the use of the same reference characters for similar components respectively. In the device of Figs. 4 and 5, the junction points of the compensating resistor 4 are located on the same, or substantially the same temperature level without necessitating a subdivision or U-configuration of the resistor body. This is achieved by using the resistor 4a semiconductor body of a higher resistance value than the compensating resistors in a device according to Figs. 2 and 3. The Hall plate 1 and the resistor 4 in the device of Figs. 4, 5 may both consist of indium antimonide (InSb), one having a positive and the other a negative temperature coefficient of resistance.

I claim:

1. A Hall-voltage generator comprising a semiconducting Hall plate having two current-supply terminals spaced from each other and defining a current axes, and two Hall electrodes spaced from each other between said terminals and defining a Hall-voltage axis normal to said current axis in the plane of the plate, an insulating carrier on which said Hall plate is mounted for subjecting it to a magnetic field transverse to said plane, resistor means mounted on said carrier and having a circuit in common with said electrodes for compensating the temperature-dependence of the Hall generator, said resistor means consisting of magnetic-field responsive resistance material and having terminal points at respective carrier localities of substantially the same temperature.

2. A Hall-voltage generator comprising a semiconducting Hall plate having two current-supply terminals spaced from each other and defining a current axis, and two Hall electrodes spaced from each other between said terminals and defining a Hall-voltage axis normal to said current axis in the plane of the plate, an insulating carrier on which said Hall plate is mounted for subjecting it to a magnetic field transverse to said plane, resistor means mounted on said carrier and having a circuit in common with said Hall electrodes for compensating the temperature-dependence of the Hall plate, said resistor means consisting of magnetic-field responsive semiconductor material and having respective end points series connected in said circuit and located at substantially the same spot of said carrier so as to be subjected to substantially the same temperature.

3. In a Hall-voltage generator according to claim 2, said resistance means being U-shaped, said end points being located at the U-ends in proximity to each other so as to be spaced from each other a distance amounting to only a fraction of the effective length of said resistance means.

4. In a Hall-voltage generator according to claim 3, said resistance means comprising two semiconductor wafers, a flat insulator on whose opposite plates said two wafers are mounted in face-to-face contact therewith, and a connecting wire electrically interconnecting said two wafers at the respective sides remote from said end points.

5. In a Hall-voltage generator according to claim 3, said resistance means comprising a wafer of semiconductor material and having a wafer plane perpendicular to that of said Hall plate.

6. In a Hall-voltage generator according to claim 1, said resistance means comprising a wafer of semiconductor material and having a wafer plane parallel to that of said Hall plate.

References Cited in the file of this patent
UNITED STATES PATENTS

| 1,778,796 | Craig | Oct. 21, 1930 |
| 2,855,549 | Kuhrt et al. | Oct. 7, 1958 |

FOREIGN PATENTS

| 1,158,776 | France | Feb. 3, 1958 |